US009772662B1

(12) United States Patent
Harting et al.

(10) Patent No.: US 9,772,662 B1
(45) Date of Patent: Sep. 26, 2017

(54) LINEAR PUSH-PUSH MECHANISM FOR REMOVABLE STORAGE CARTRIDGE SYSTEM

(71) Applicant: HGST Netherlands B.V., Amsterdam (NL)

(72) Inventors: John L. Harting, San Jose, CA (US); Thomas F. Meehan, Los Altos, CA (US); Herman Chong-Han Yang, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/077,302

(22) Filed: Mar. 22, 2016

(51) Int. Cl.
*G06F 1/16* (2006.01)
*H05K 5/02* (2006.01)
*G06F 1/18* (2006.01)
*H05K 5/00* (2006.01)

(52) U.S. Cl.
CPC ........... *G06F 1/187* (2013.01); *H05K 5/0021* (2013.01); *H05K 5/0069* (2013.01); *H05K 5/0221* (2013.01); *H05K 5/0295* (2013.01)

(58) Field of Classification Search
CPC .............................. G11B 33/124; G06F 1/187
USPC ....................................................... 361/679.33
See application file for complete search history.

(56) References Cited

U.S. PATENT DOCUMENTS

| | | | |
|---|---|---|---|
| 4,071,859 A * | 1/1978 | Sami | G11B 15/675 360/251.1 |
| 4,530,252 A * | 7/1985 | Sarges | F16H 35/14 360/96.51 |
| 4,936,790 A * | 6/1990 | De La Cruz | H01R 12/87 235/482 |
| 5,231,552 A | 7/1993 | Schneider et al. | |
| 6,043,954 A | 3/2000 | Muse et al. | |
| 6,097,567 A | 8/2000 | Hanson | |
| 6,721,176 B2 | 4/2004 | Kwong et al. | |
| 7,077,671 B2 * | 7/2006 | Su | H01R 13/635 439/159 |
| 7,386,868 B2 | 6/2008 | McCormack | |
| 7,997,914 B2 | 8/2011 | Bychkov et al. | |
| 8,215,727 B2 | 7/2012 | Barrall et al. | |
| 8,337,224 B2 * | 12/2012 | Bychkov | G06K 13/0806 439/159 |
| 8,379,840 B2 | 2/2013 | Scherling | |
| 8,582,401 B2 | 11/2013 | Kawasaki et al. | |
| 8,737,057 B2 | 5/2014 | Terry | |

(Continued)

OTHER PUBLICATIONS

Sid Hazra, How is a memory card held in mobile phones? How does the mechanism work?, downloaded on Aug. 25, 2015 from: http://www.quora.com/How-is-a-memory-card-held-in-mobile-phones-How-does-the-mechanism-work.

(Continued)

*Primary Examiner* — Adrian S Wilson
(74) *Attorney, Agent, or Firm* — John D. Henkhaus

(57) ABSTRACT

A removable storage cartridge system may include a linear push-push mechanism comprising a carriage having a lock bar and a lock bar spring, and an enclosure having a mounting bracket having a lock guide. The lock guide is configured to interact with the lock bar and spring such that, in response to a first pushing force, reception of the carriage into the mounting bracket positions the carriage into a locked position within the enclosure and, in response to a second pushing force, the carriage is released from the locked position and ejected from the system.

19 Claims, 5 Drawing Sheets

(56) References Cited

U.S. PATENT DOCUMENTS

| | | | |
|---|---|---|---|
| 8,944,833 B2* | 2/2015 | Takahashi | H05K 5/0295 439/159 |
| 9,053,741 B2 | 6/2015 | Steinhilber | |
| 2002/0192991 A1* | 12/2002 | Motojima | H01R 13/62905 439/157 |
| 2008/0081677 A1 | 4/2008 | Lai | |
| 2013/0070415 A1* | 3/2013 | Terry | G11B 33/124 361/679.38 |

OTHER PUBLICATIONS

Unknown, The DNV FF Push to eject mechanism (series of screenshots from video), youtube.com, video published on Jun. 22, 2013, last found at: https://www.youtube.com/watch?v=3fN2zFDi2Ck.

* cited by examiner

INSERT A REMOVABLE STORAGE DEVICE CARTRIDGE, COMPRISING A REMOVABLE STORAGE DEVICE HOUSED IN A CARRIAGE, INTO A LOCKED POSITION WITHIN AN ENCLOSURE BAY MOUNTING BRACKET, INCLUDING (A) SLIDING A PROTUBERANCE OF A CARRIAGE LOCK BAR INTO A MOUNTING BRACKET LOCK GUIDE INSERTION CHANNEL TO REMOVABLY COUPLE THE CARTRIDGE WITH A LOCK GUIDE DETENT CORRESPONDING TO THE LOCKED POSITION, (B) EXTENDING A CARRIAGE LOCK BAR SPRING THAT IS POSITIONED AT A DISTANCE IN A DIRECTION FROM THE PROTUBERANCE AND PROVIDES A ROTATIONAL BIAS TO THE LOCK BAR TOWARD THE DIRECTION, AND (C) ENGAGING A REMOVABLE STORAGE DEVICE DATA INTERFACE CONNECTOR WITH A SYSTEM CIRCUIT BOARD DATA INTERFACE CONNECTOR;

WHEREIN THE MOUNTING BRACKET LOCK GUIDE COMPRISES AN INCLINED WALL THAT, IN CONJUNCTION WITH A GUIDE WALL, FORMS THE INSERTION CHANNEL LEADING TO THE LOCK DETENT

702

↓

EJECT THE REMOVABLE STORAGE DEVICE CARTRIDGE FROM WITHIN THE ENCLOSURE BAY MOUNTING BRACKET, INCLUDING (A) CONTRACTING THE SPRING AND ALLOWING THE BIAS TO FORCE THE PROTUBERANCE OUT OF THE LOCK GUIDE DETENT INTO SLIDING WITHIN A MOUNTING BRACKET LOCK GUIDE EJECTION CHANNEL, AND (B) DISENGAGING THE REMOVABLE STORAGE DEVICE DATA INTERFACE CONNECTOR FROM THE SYSTEM CIRCUIT BOARD DATA INTERFACE CONNECTOR

LINEAR PUSH-PUSH MECHANISM FOR REMOVABLE STORAGE CARTRIDGE SYSTEM

FIELD OF EMBODIMENTS

Embodiments of the invention may relate generally to removable storage cartridge systems and more particularly to a push-push mechanism used for insertion and ejection of a removable storage device.

BACKGROUND

With the continued rise in the use of all kinds of digital media comes a corresponding demand for digital data storage solutions. Home consumers and professionals alike demand portability, flexibility, expandability, and ease of use, for example, in digital data storage systems. Hence, data storage system designers and engineers work to meet such demands.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a removable storage cartridge system, a removable storage system enclosure, a removable storage device carriage configured to removably couple with a removable storage device, and a method of configuring a removable storage cartridge system.

Embodiments include such a carriage comprising a lock bar and a lock bar spring, and such an enclosure comprising a mounting bracket comprising a lock guide. The lock guide is configured to interact with the lock bar and spring such that, in response to a first pushing force applied directly or indirectly to the carriage, reception of the carriage into the mounting bracket positions the carriage into a locked position within the enclosure and, in response to a second pushing force applied directly or indirectly to the carriage, the carriage is released from the locked position. This type of mechanism may be referred to as a push-push mechanism.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 7 is a flow diagram illustrating a method of configuring a removable storage cartridge system, according to an embodiment.

DETAILED DESCRIPTION

Approaches to a removable storage cartridge system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a removable storage system, such as a system having multiple hard disk drive (HDD) storage devices and/or solid-state drive (SSD) storage devices (which may also be referred to as "semiconductor memory devices"). Thus, in accordance with an embodiment, a perspective view illustrating a removable storage system is shown in FIG. 1 to illustrate an exemplary operating context.

Figure 1:
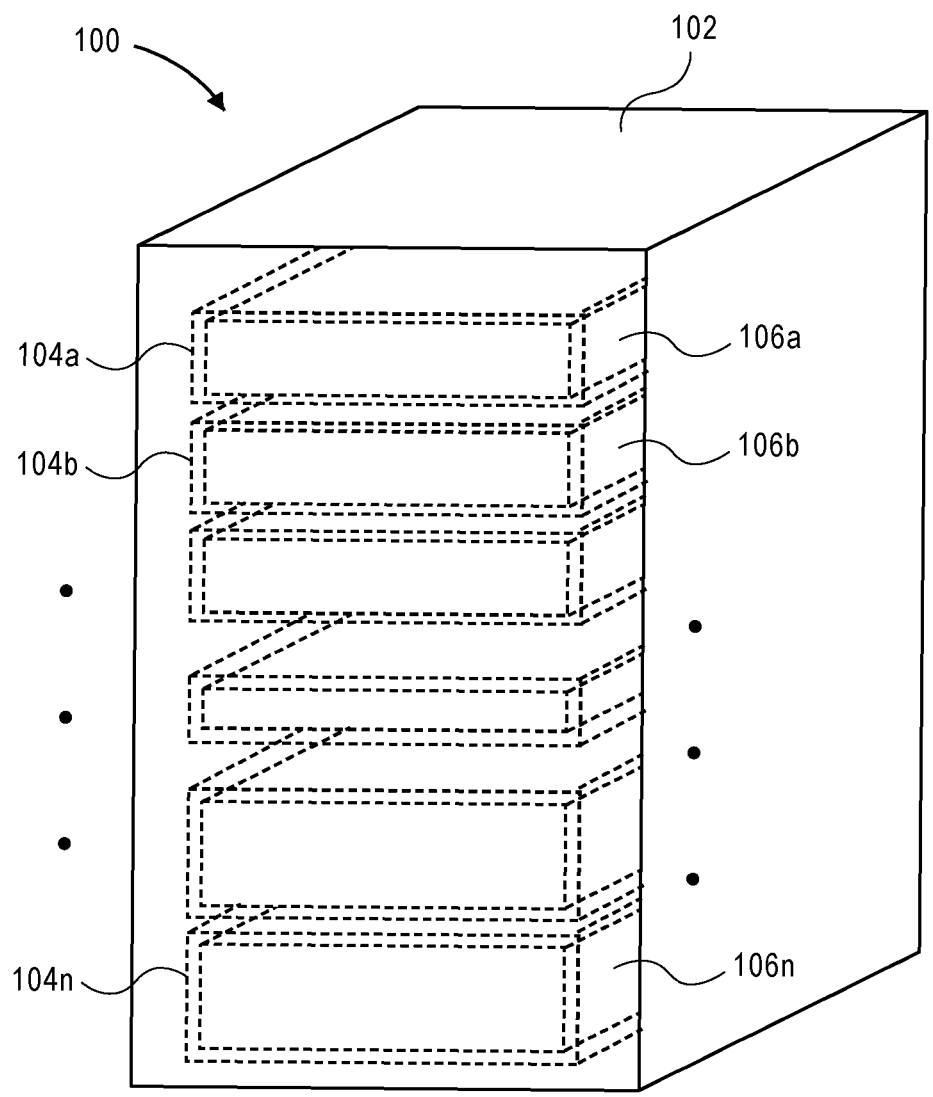
FIG. 1 is a front perspective view illustrating a removable storage system, according to an embodiment.

FIG. 1 is a front perspective view illustrating a removable storage system, according to an embodiment. Removable storage system 100 comprises an enclosure 102 having at least one bay 104a-n configured to house a respective removable storage device 106a-n, where n represents a variable number that may vary from implementation to implementation. As described in more detail elsewhere herein, each bay 104a-n may have a corresponding enclosure mounting bracket coupled therewith and/or therein, and each removable storage device 106a-n may be adapted into a removable storage cartridge by being removably coupled with a removable storage device carriage, according to embodiments. Thus, a removable storage cartridge system, such as removable storage system 100, may be configured or provisioned to house a plurality of removable storage cartridges within a respective mounting bracket.

The number of removable storage cartridges or removable storage devices (e.g., n) that enclosure 102 is configured to house may vary from implementation to implementation. Furthermore, a given removable storage system 100 may be adaptable and reconfigurable into different configurations housing a different number and/or different sizes of removable storage devices based, for example, on corresponding compatible enclosure mounting brackets and removable storage device carriages.

Removable Storage Cartridge System

Figure 2:
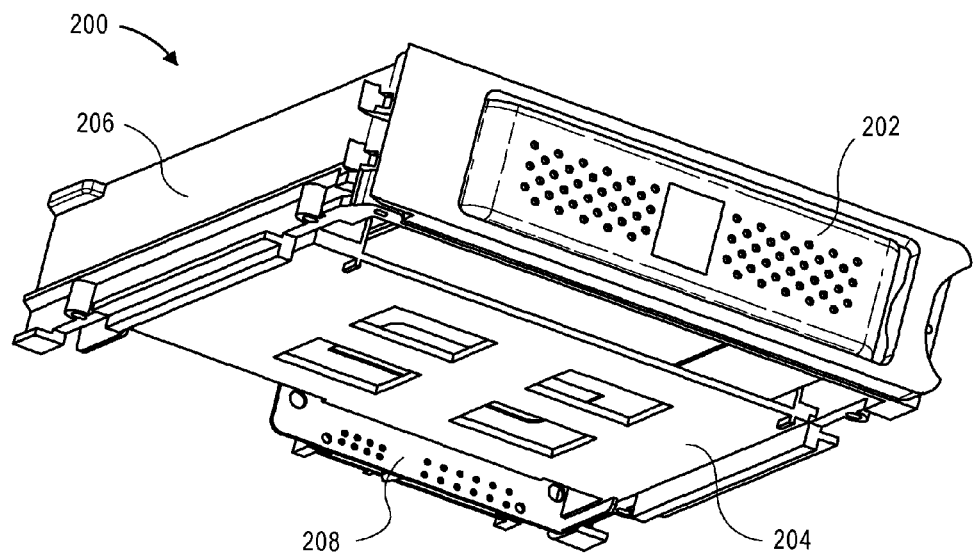
FIG. 2 is bottom perspective view illustrating components of a removable storage cartridge system, according to an embodiment.

FIG. 2 is bottom perspective view illustrating components of a removable storage cartridge system, according to an embodiment. Components of a removable storage cartridge system 200 comprise a removable storage device 202 (e.g., a hard disk drive [HDD] or a solid-state drive [SSD], also known as a semiconductor memory device) removably coupled with a removable storage device carriage 204 (or "carriage 204"), and an enclosure mounting bracket 206 (or "mounting bracket 206") that may be coupled with an enclosure, such as enclosure 102 (FIG. 1), and positioned within an enclosure bay, such as a bay 104a-n. According to an embodiment, a removable storage device 202 can be removably inserted into and thus housed within a respective carriage 204, forming a "removable storage device cartridge" (or "cartridge"). Continuing, a cartridge can then be removably inserted into, removably coupled with, housed within a respective mounting bracket 206. Components further comprise a printed circuit board 208 (or "PCB 208"). The PCB 208 is configured to mate with a corresponding circuit board constituent to the removable storage device 202. In a multiple-bay system, each respective PCB 208 may communicate with a removable storage cartridge system "master" circuit board which, in turn, may communicate with an external system such as a computer.

Configured as described in the foregoing description, a loaded cartridge can be inserted into a removable storage cartridge system (e.g., system 100 of FIG. 1) and removably locked into place using a push-push mechanism described in more detail herein. A circuit board constituent to the removable storage device 202 would mate with the PCB 208 as part of this cartridge insertion process, by way of respective electrical connectors, according to an embodiment. The removable storage device 202 is held firmly in place while a user can electrically access the removable storage device 202 for reading and writing data. When the user wants to remove the removable storage device 202 (e.g., as a cartridge) from the removable storage cartridge system 100, one would push the removable storage device 202 further into the removable storage cartridge system 100, which unlocks the cartridge and allows it to be removed from the enclosure (e.g., 102 of FIG. 1).

Removable Storage Cartridge

Figure 3:
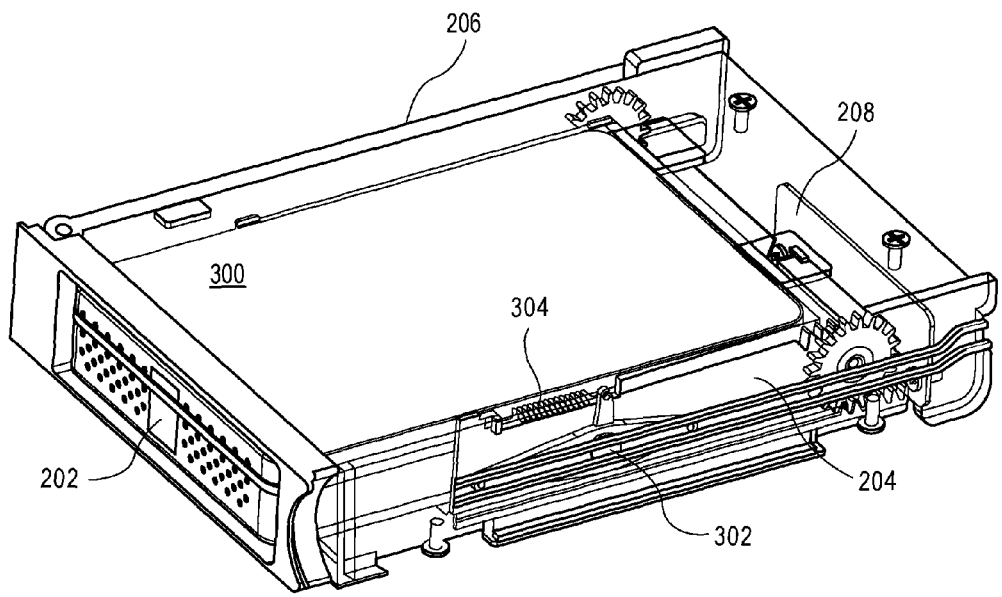
FIG. 3 is top perspective view illustrating a removable storage cartridge inserted in a mounting bracket, according to an embodiment.

FIG. 3 is top perspective view illustrating a removable storage cartridge inserted in a mounting bracket, according to an embodiment. Similarly as described in reference to FIG. 2, a removable storage device cartridge 300 (or "cartridge 300") comprises a removable storage device 202 removably inserted into and thus housed within and coupled with a carriage 204. Further, the cartridge 300 is depicted as inserted in the mounting bracket 206. In FIG. 3, the wall of the carriage 204 is depicted transparently so that other components on the inside of that wall can be viewed.

According to an embodiment, a removable storage cartridge system (e.g., system 100 of FIG. 1) comprises a rotatable lock bar 302 and a lock bar spring 304. According to an embodiment, the lock bar 302 and lock bar spring 304 are constituent to the carriage 204, where such a carriage can be inserted into and ejected from system 100 as a unit along with the lock bar 302 and lock bar spring 304 (i.e., as an assembly), preferably as part of a cartridge 300. The lock bar 302 and the lock bar spring 304 are part of a linear push-push mechanism, which is described in more detail herein.

Lock Guide

Figure 4:
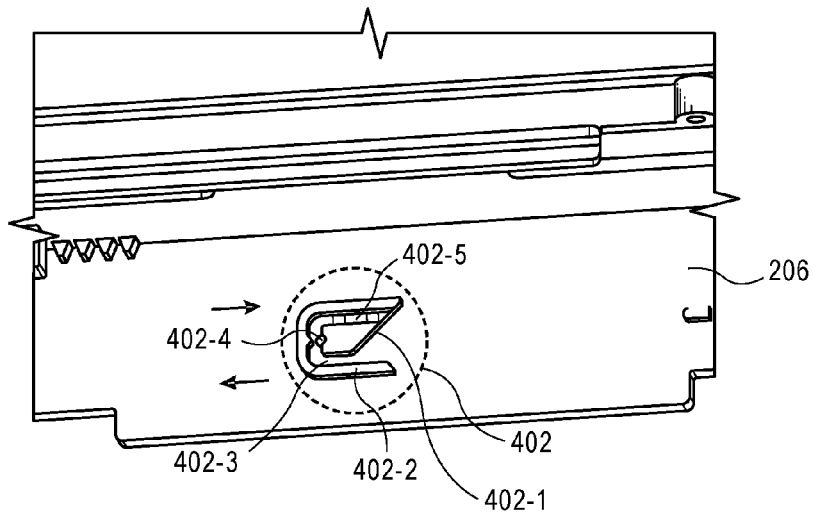
FIG. 4 is a side view illustrating a push-push lock guide, according to an embodiment.

FIG. 4 is a side view illustrating a push-push lock guide, according to an embodiment. According to an embodiment, removable storage cartridge system (e.g., system 100 of FIG. 1) comprises a lock guide 402. According to an embodiment, the lock guide 402 is constituent to the mounting bracket 206, in which a carriage 204 (FIGS. 2-3) can be inserted into and ejected from system 100 as a unit with the lock bar 302 (FIG. 3) and lock bar spring 304 (FIG. 3) (i.e., as an assembly), preferably as part of a cartridge 300. The lock guide 402 is part of a linear push-push mechanism, which is described in more detail herein.

According to an embodiment, lock guide 402 comprises an inclined wall 402-1 structure that, in conjunction with a guide wall 402-2, forms an insertion channel 402-3. The insertion channel 402-3 leads to a lock detent 402-4, which corresponds to a locked position, such as when a lock bar protuberance 302-1 (FIG. 5) is disposed therein or therewith. A detent may be described as a device (e.g., a catch) for positioning and holding one mechanical part in relation to another mechanical part in a manner such that it can be released by force applied to one of the parts. Lock guide 402 further comprises an ejection channel 402-5 positioned opposing the insertion channel 402-3 with the lock detent 402-4 in between. According to an embodiment, the insertion channel 402-3, the lock detent 402-4, and the ejection channel 402-5 together form an m-shape (e.g., as or similar to as depicted in FIG. 4).

Lock Bar

Figure 5:
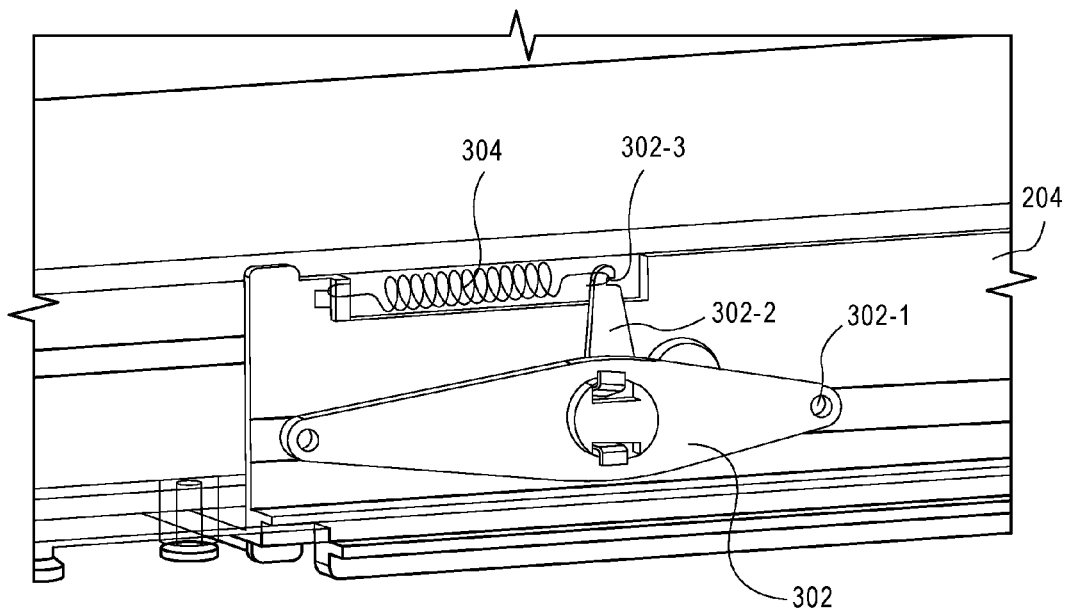
FIG. 5 is a side view illustrating a push-push lock mechanism, according to an embodiment.

FIG. 5 is a side view illustrating a push-push lock mechanism, according to an embodiment. The lock mechanism comprises the rotatable lock bar 302 and the lock bar spring 304. According to an embodiment, the lock bar 302 comprises a protuberance 302-1 (for non-limiting examples, a pin or nub) configured and positioned to slide within the insertion channel 402-3 (FIG. 4) and the ejection channel 402-5 (FIG. 4) and to removably couple with the lock detent 402-4 when in a position corresponding to the locked position associated with a cartridge 300. Alternate structural forms other than a protuberance 302-1 are contemplated for providing a guide for movement of the lock bar 302 within the insertion channel 402-3 and the ejection channel 402-5 and still remain within the scope and practice of embodiments. The lock bar 302 further comprises a spring attachment extension 302-2 having a spring attachment feature 302-3 (for non-limiting examples, a slot or hole), which lock bar spring 304 can attach to at one of its ends. The lock bar spring 304 is configured and positioned such that it is extendable in response to a first pushing force applied directly or indirectly to the carriage 204 in a particular direction, and is contractible in response to a second pushing force applied directly or indirectly to the carriage 204 in the particular direction. The first pushing force causes the reception of the carriage 204 into the mounting bracket 206 (FIGS. 2 and 4) and positions the carriage 204 into a locked position within the enclosure (e.g., enclosure 102 of FIG. 1), and the second pushing force releases the carriage 204 from the locked position.

The lock guide 402 (FIG. 4) and the lock bar 302 (FIGS. 3 and 5) operate together to form a linear push-push mechanism for inserting (e.g., in the direction of the bottom arrow shown in FIG. 4) and ejecting (e.g., in the direction of the top arrow shown in FIG. 4) a removable storage device 202 (FIGS. 2, 3) into and from, respectively, a removable storage cartridge system such as system 100 (FIG. 1).

Referring back to FIG. 5, according to an embodiment, the lock bar spring 304 is positioned at a distance and in a direction away from the protuberance 302-1, which thereby provides a rotational bias to the lock bar 302 in a direction toward such direction (e.g., counter-clockwise in a configuration such as depicted in FIG. 5). Consequently, in response to the aforementioned second pushing force and the bias, the lock bar spring 304 forces the protuberance 302-1 to release or unlock from the lock detent 402-4 and to enter and slide within the ejection channel 402-5 (FIG. 4), e.g., in the direction of the top arrow shown in FIG. 4.

Removable Storage Cartridge System Push-Push Mechanism

Figure 6A:
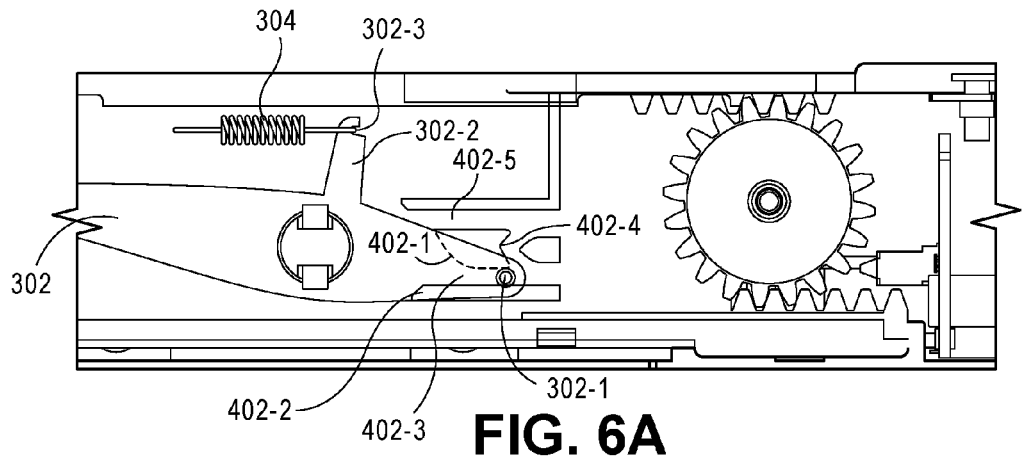
FIG. 6A is a side view illustrating a removable storage cartridge system push-push mechanism in a first position, according to an embodiment.
Figure 6B:
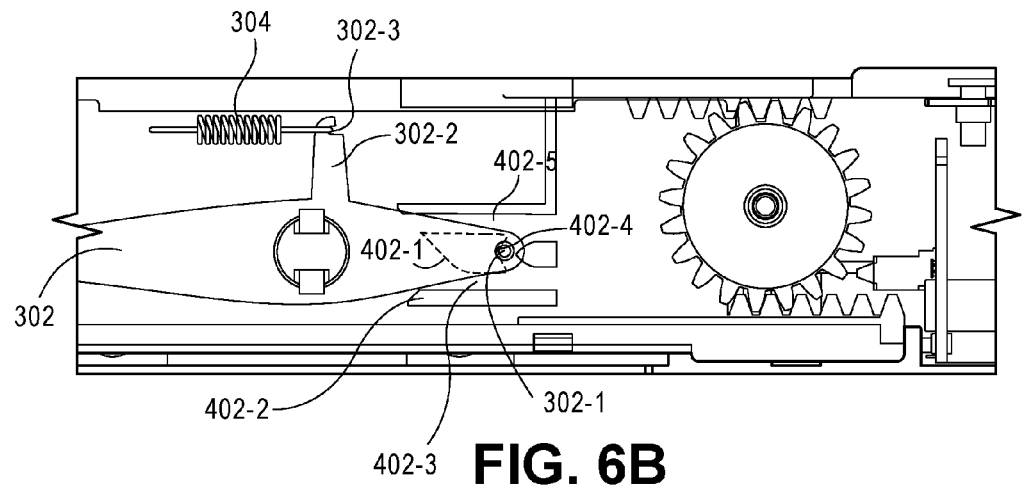
FIG. 6B is a side view illustrating a removable storage cartridge system push-push mechanism in a second position, according to an embodiment.
Figure 6C:
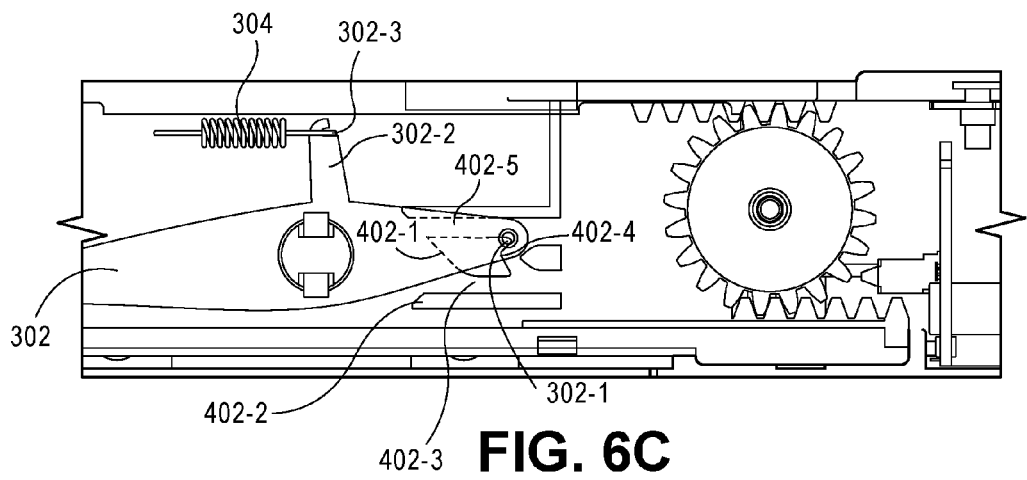
FIG. 6C is a side view illustrating a removable storage cartridge system push-push mechanism in a third position, according to an embodiment.

FIGS. 6A-6C are views illustrating a removable storage cartridge system push-push mechanism in multiple positions, according to an embodiment.

FIG. 6A is a side view illustrating a removable storage cartridge system push-push mechanism in a first position, FIG. 6B is a side view illustrating a removable storage cartridge system push-push mechanism in a second position, and FIG. 6C is a side view illustrating a removable storage cartridge system push-push mechanism in a third position, all according to an embodiment.

Shown in each of FIGS. 6A-6C are the lock bar 302, including the protuberance 302-1 and the spring attachment extension 302-2 having the spring attachment feature 302-3 to which lock bar spring 304 is attached. For example, and according to an embodiment, the foregoing lock bar 302 and lock bar spring 304 are constituent to, or coupled to the outer surface of a wall of, the carriage 204 (FIGS. 2, 3, 5). Further shown in FIG. 6A are the lock guide 402 (FIG. 4) having the inclined wall 402-1, the guide wall 402-2, the insertion channel 402-3, the lock detent 402-4, and the ejection channel 402-5. For example, and according to an embodiment, the foregoing lock guide 402 is constituent to, or coupled to the inner surface of a wall of, the mounting bracket 206 (FIGS. 2, 4). Thus, when the carriage 204 is inserted into the mounting bracket 206, the lock bar 302 and the lock bar spring 304 interact with the lock guide 402 to essentially form the linear push-push mechanism for inserting and ejecting a removable storage cartridge (e.g., cartridge 300 of FIG. 3) into and from, respectively, a removable storage cartridge system such as system 100 (FIG. 1).

FIG. 6A depicts the push-push mechanism in an interim position in response to a direct or indirect first pushing force applied to the carriage 204 (FIGS. 2, 3, 5), in the direction into, for example, a bay 104a-n (FIG. 1) of the enclosure 102 (FIG. 1) of a removable storage cartridge system such as system 100 (FIG. 1). That is, the first pushing force would be applied in a direction from left to right of the FIG. 6A drawing. Note that an indirect application of the first pushing force may include applying the first pushing force more directly to the removable storage device 202 (FIGS. 2, 3) or the cartridge 300 (FIG. 3). In this interim position, the protuberance 302-1 has already interacted with (or is in the process of interacting with) the inclined wall 402-1, is sliding along the insertion channel 402-3, and is about to engage with the lock detent 402-4. Furthermore, this initial action between the lock bar 302 and the lock guide 402 has rotated the lock bar a bit clockwise and extended the spring 304.

FIG. 6B depicts the push-push mechanism in a locked position in response to the first pushing force. In this locked position, the protuberance 302-1 has overcome the reactive force of the inclined wall 402-1 and a spring force associated with lock bar spring 304, and is engaged with the lock detent 402-4. At this point, a data interface connector associated with the removable storage device 202 (FIGS. 2, 3) has engaged with a corresponding data interface connector constituent to the PCB 208 (FIG. 2) such that information/data storage and retrieval operations between the removable storage device 202 and a communicatively-connected host device (e.g., a computer) may be performed. For non-limiting examples, each of the foregoing data interface connectors may be compatible with SATA (Serial ATA, or Serial AT [Advanced Technology] Attachment) and SAS (Serial Attached SCSI, or Serial Attached Small Computer System Interface) communication interfaces.

FIG. 6C depicts the push-push mechanism in an interim position in response to a direct or indirect second pushing force applied to the carriage 204 (FIGS. 2, 3, 5), in the direction further into, for example, a bay 104a-n (FIG. 1) of the enclosure 102 (FIG. 1) of a removable storage cartridge system such as system 100 (FIG. 1). That is, the second pushing force would be applied in the same direction as the first pushing force, thus the characterization as a "push-push mechanism". That is, the second pushing force would be applied in a direction from left to right of the FIG. 6C drawing. Note that an indirect application of the second pushing force may include applying the second pushing force more directly to the removable storage device 202 (FIGS. 2, 3) or the cartridge 300 (FIG. 3).

In this interim position, the protuberance 302-1 has now been released from the lock detent 402-4, and is about to begin sliding along the ejection channel 402-5 to complete ejection from the system 100. As described, with the lock bar spring 304 positioned at a distance and in a direction away from the protuberance 302-1, a rotational bias (a biasing force) is applied to the lock bar 302 in a direction toward such direction (e.g., counter-clockwise in a configuration such as depicted in FIGS. 6A-6C). Consequently, in response to the aforementioned second pushing force and the bias, the lock bar spring 304 forces the protuberance 302-1 to release or unlock from the lock detent 402-4 and to enter and slide within the ejection channel 402-5. Furthermore, this final action between the lock bar 302 and the lock guide 402 has rotated the lock bar a bit counter-clockwise and allowed contraction of the spring 304, with a consequent force acting in a direction from right to left of the FIG. 6C drawing. Such contraction of the spring facilitates the ejection of the cartridge 300 from the system. At this point, the data interface connector associated with the removable storage device 202 (FIGS. 2, 3) has disengaged from the corresponding data interface connector constituent to the PCB 208 (FIG. 2).

Method of Configuring a Removable Storage Cartridge System

FIG. 7 is a flow diagram illustrating a method of configuring a removable storage cartridge system, according to an embodiment.

At block 702, a removable storage device cartridge, comprising a removable storage device housed in a carriage, is inserted into a locked position within an enclosure bay mounting bracket. For example, cartridge 300 (FIG. 3) is inserted into a locked position (such as shown in FIG. 6B), within a mounting bracket 206 (FIG. 2) of a bay 104a-n (FIG. 1) of an enclosure 102 (FIG. 1), using a first pushing force in a particular direction.

The act of inserting the cartridge into the locked position includes sliding a protuberance of a carriage lock bar into a mounting bracket lock guide insertion channel to removably couple the cartridge with a lock guide detent corresponding to the locked position. For example, protuberance 302-1 (FIGS. 5, 6A-6C) of the lock bar 302 (FIGS. 5, 6A-6C) of the carriage 204 (FIGS. 2, 3, 5) is slid into an insertion channel 402-3 (FIGS. 4, 6A-6C) mounting bracket 206 (FIGS. 2, 3, 4) lock guide 402 (FIG. 4) to removably couple the cartridge 300 (FIG. 3) with the lock detent 402-4 (FIGS. 4, 6A-6C) of the lock guide 402 corresponding to the locked position. Recall that the lock guide 402 comprises the inclined wall 402-1 (FIG. 4) structure that, in conjunction with the guide wall 402-2 (FIG. 4), forms the insertion channel 402-3.

The act of inserting the cartridge into the locked position further includes extending a carriage lock bar spring that is positioned at a distance in a direction from the protuberance, thereby providing a rotational bias to the lock bar toward the direction. For example, extending the lock bar spring 304 (FIGS. 5, 6A-6C) of the carriage 204 (FIGS. 2, 3, 5) positioned relative to the lock bar 302 (FIGS. 5, 6A-6C) provides a counter-clockwise rotational bias to the lock bar 302.

The act of inserting the cartridge into the locked position further includes engaging a removable storage device data interface connector with a system circuit board data interface connector. For example, a data interface connector associated with the removable storage device 202 (FIGS. 2, 3) engages with a corresponding data interface connector constituent to the PCB 208 (FIG. 2) such that information/data storage and retrieval operations between the removable storage device 202 and a communicatively-connected host device (e.g., a computer) may be performed.

At block 704, the removable storage device cartridge is ejected from within the enclosure bay mounting bracket. For example, cartridge 300 (FIG. 3) is disengaged from the locked position (such as shown in FIG. 6C) and ejected from the mounting bracket 206 (FIG. 2) of a bay 104a-n (FIG. 1) of an enclosure 102 (FIG. 1), using a second pushing force in the same particular direction.

The act of ejecting the cartridge from the mounting bracket includes contracting the spring and allowing the bias to force the protuberance out of the lock guide detent into sliding within a mounting bracket lock guide ejection channel. For example, ejecting the cartridge 300 (FIG. 3) contracts the lock bar spring 304, thereby allowing the bias to force the protuberance 302-1 (FIGS. 5, 6A-6C) out of the lock detent 402-4 (FIGS. 4, 6A-6C) of the lock guide 402 (FIG. 4) of the mounting bracket 206 (FIGS. 2, 3, 4) and into sliding within the ejection channel 402-5 (FIGS. 4, 6A-6C) of the lock guide 402.

The act of ejecting the cartridge from the mounting bracket further includes disengaging the removable storage device data interface connector from the system circuit board data interface connector. For example, the data interface connector associated with the removable storage device 202 (FIGS. 2, 3) disengages from the corresponding data interface connector constituent to the PCB 208 (FIG. 2).

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A removable storage cartridge system comprising:
   an enclosure comprising a bay configured to house a removable data storage device;
   a removable storage device carriage configured to removably couple with a removable data storage device;
   a lock bar;
   a lock bar spring;
   a mounting bracket coupled with said enclosure within said bay; and
   a lock guide;
   wherein said lock guide is configured to interact with said lock bar and said lock bar spring such that:
      in response to a first pushing force applied directly or indirectly to said carriage in a particular direction, reception of said carriage into said mounting bracket positions said carriage into a locked position within said enclosure, and
      in response to a second pushing force applied directly or indirectly to said carriage in said particular direction, said carriage is released from said locked position.

2. The removable storage cartridge system of claim 1, wherein said carriage comprises:
   said lock bar, and
   said lock bar spring; and
   wherein said mounting bracket comprises said lock guide.

3. The removable storage cartridge system of claim 1, wherein said enclosure comprises a plurality of bays each configured to house a respective data storage device, wherein said removable storage cartridge system further comprises:
   a plurality of removable storage device carriages each configured to removably couple with a respective removable data storage device; and
   a plurality of mounting brackets each coupled with said enclosure within a respective bay of said plurality of bays.

4. The removable storage cartridge system of claim 1, wherein said lock guide comprises:
   an inclined wall that, in conjunction with a guide wall, forms an insertion channel leading to a lock detent corresponding to said locked position, and an ejection channel positioned opposing said insertion channel with said detent in between.

5. The removable storage cartridge system of claim 4, wherein said insertion channel, said lock detent, and said ejection channel together form an m-shape.

6. The removable storage cartridge system of claim 4, wherein said lock bar comprises:
a protuberance configured to slide within said insertion channel and said ejection channel and to removably couple with said lock detent when corresponding to said locked position, and
a spring attachment feature; and
wherein said lock bar spring is attached to said spring attachment feature and extends in response to said first pushing force and contracts in response to said second pushing force.

7. The removable storage cartridge system of claim 6, wherein said lock bar spring is positioned at a distance in a direction from said protuberance and provides a rotational bias to said lock bar toward said direction; and
wherein, in response to said second pushing force and said bias, said lock bar spring forces said protuberance to enter and slide within said ejection channel.

8. The removable storage cartridge system of claim 1, further comprising:
a removable data storage device housed in said carriage.

9. The removable storage cartridge system of claim 1, further comprising:
a removable data storage device housed in said carriage and comprising a data interface connector; and
a circuit board comprising a data interface connector configured to engage with said storage device data interface connector in response to said first pushing force and to disengage from said storage device data interface connector in response to said second pushing force.

10. A method of configuring a removable storage cartridge system, the method comprising:
inserting a removable storage device cartridge, comprising a removable data storage device housed in a carriage, into a locked position within an enclosure bay mounting bracket;
wherein said inserting includes (a) sliding a protuberance of a carriage lock bar into a mounting bracket lock guide insertion channel to removably couple said cartridge with a lock guide detent corresponding to said locked position, and (b) extending a carriage lock bar spring that is positioned at a distance in a direction from said protuberance and provides a rotational bias to said lock bar toward said direction, and (c) engaging a removable storage device data interface connector with a system circuit board data interface connector;
wherein said mounting bracket lock guide comprises an inclined wall that, in conjunction with a guide wall, forms said insertion channel leading to said lock detent.

11. The method of claim 10, further comprising:
ejecting said removable storage device cartridge from within said enclosure bay mounting bracket;
wherein said ejecting includes (a) contracting said spring and allowing said bias to force said protuberance out of said lock guide detent into sliding within a mounting bracket lock guide ejection channel, and (b) disengaging said removable storage device data interface connector from said system circuit board data interface connector.

12. A removable storage system enclosure comprising:
a bay configured to house a removable data storage device; and
a mounting bracket within said bay, wherein said mounting bracket comprises a lock guide;
wherein said lock guide is configured to interact with a removable storage device carriage lock bar and spring such that:
in response to a first pushing force applied directly or indirectly to said removable storage device carriage in a particular direction, reception of said carriage into said mounting bracket positions said carriage into a locked position within said enclosure, and
in response to a second pushing force applied directly or indirectly to said carriage in said particular direction, said carriage is released from said locked position.

13. The removable storage system enclosure of claim 12, further comprising:
a plurality of bays each configured to house a respective data storage device; and
a plurality of mounting brackets each within a respective bay of said plurality of bays.

14. The removable storage system enclosure of claim 12, wherein said lock guide comprises:
an inclined wall that, in conjunction with a guide wall, forms an insertion channel leading to a lock detent corresponding to said locked position, and
an ejection channel positioned opposing said insertion channel with said detent in between.

15. The removable storage system enclosure of claim 14, wherein said insertion channel, said lock detent, and said ejection channel together form an m-shape.

16. The removable storage system enclosure of claim 12, further comprising:
a circuit board comprising a data interface connector configured to engage with a removable storage device data interface connector in response to said first pushing force and to disengage from said storage device data interface connector in response to said second pushing force.

17. A removable storage device carriage configured to removably couple with a removable data storage device, the carriage comprising:
a lock bar comprising:
a protuberance configured to slide within an insertion channel and an ejection channel of a removable storage system enclosure mounting bracket lock guide and to removably couple with a lock detent of said lock guide when corresponding to a locked position, and
a spring attachment feature; and
a lock bar spring attached to said spring attachment feature and which extends in response to a first pushing force and contracts in response to a second pushing force.

18. The removable storage device carriage of claim 17, wherein said lock bar is configured to interact with said removable storage system mounting bracket lock guide such that:
in response to said first pushing force applied directly or indirectly to said carriage in a particular direction, reception of said carriage into said mounting bracket couples said protuberance with said lock detent, and in response to said second pushing force applied directly or indirectly to said carriage in said particular direction, said carriage is released from said lock detent.

19. The removable storage device carriage of claim 18, wherein said lock bar spring is positioned at a distance in a direction from said protuberance and provides a rotational bias to said lock bar toward said direction; and wherein, in response to said second pushing force and said bias, said lock bar spring forces said protuberance to enter and slide within said ejection channel.

\* \* \* \* \*